(No Model.)
M. C. HALL.
RUNNING GEAR FOR WAGONS.
No. 372,907. Patented Nov. 8, 1887.
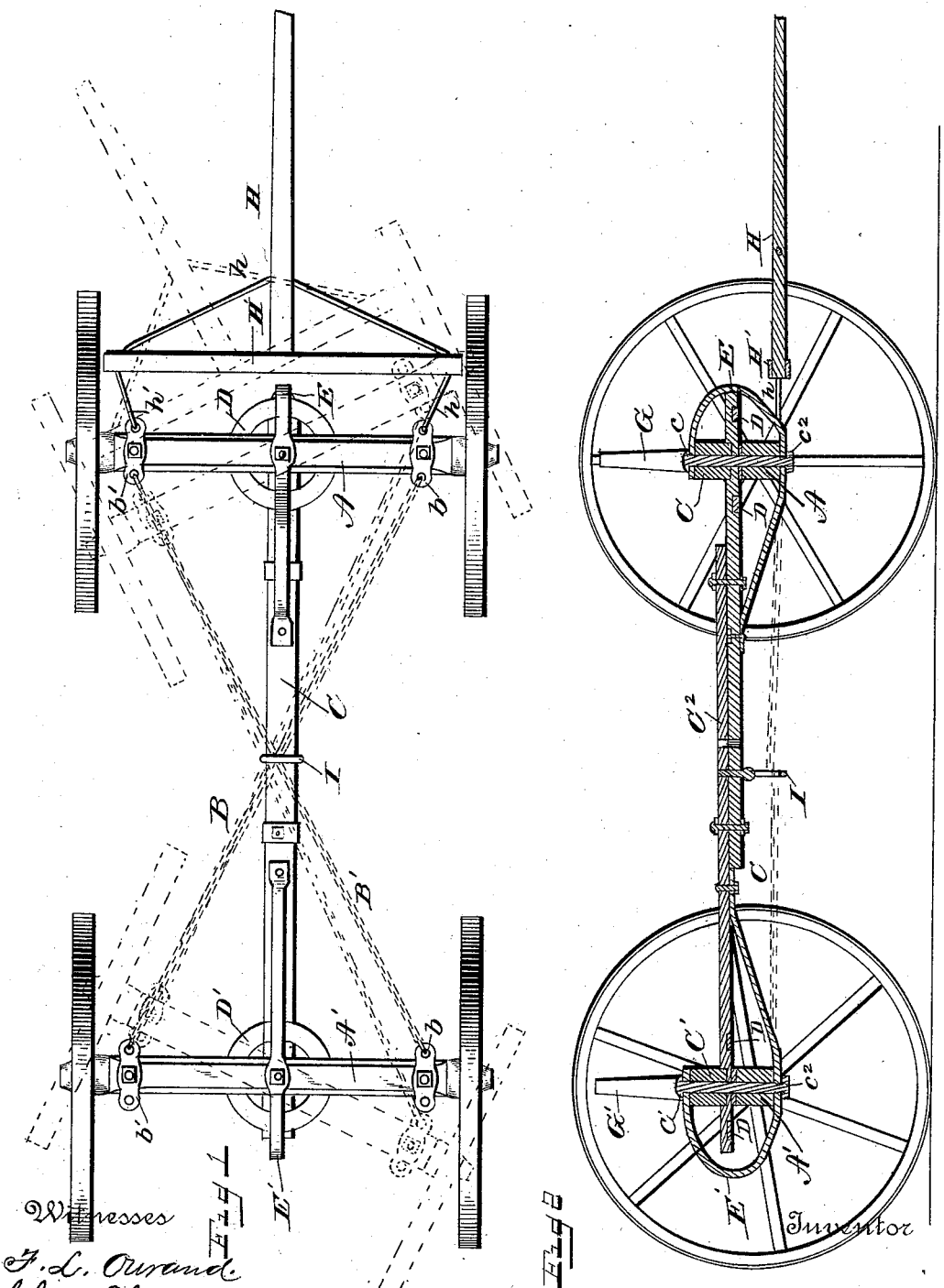
Witnesses
F. L. Ourand
Chas. Rhodes.
Inventor
Michael C. Hall
By his Attorney
George C. Poulton.

UNITED STATES PATENT OFFICE.

MICHAEL C. HALL, OF CHARLOTTEVILLE, ASSIGNOR OF ONE-HALF TO DANIEL KERR FERGUSON, OF SIMCOE, ONTARIO, CANADA.

RUNNING-GEAR FOR WAGONS.

SPECIFICATION forming part of Letters Patent No. 372,907, dated November 8, 1887.

Application filed June 16, 1887. Serial No. 241,503. (No model.) Patented in Canada May 7, 1887, No. 26,650.

*To all whom it may concern:*

Be it known that I, MICHAEL C. HALL, a subject of the Queen of Great Britain, residing at the township of Charlotteville, in the county of Norfolk, Province of Ontario, in the Dominion of Canada, have invented certain new and useful Improvements in Running-Gear for Wagons and other Vehicles, (for which I have obtained Letters Patent in the Dominion of Canada, No. 26,650, bearing date May 7, 1887;) and I do hereby declare the following to be a full, clear, and exact description of the invention, such as will enable others skilled in the art to which it appertains to make and use the same.

My invention has relation to improvements in running-gear for wagons and other vehicles; and it consists in the novel construction and arrangement of parts, as will be hereinafter described, and more particularly pointed out in the claims.

In the accompanying drawings, Figure 1 is a bottom view of my invention. Fig. 2 is a longitudinal section of the same.

Referring to the drawings, the letters A A' designate, respectively, the forward and rear axles of the running-gear of the wagon mounted on suitable wheels, as shown. The axles are provided with coupling-plates $b$ $b'$ near their ends, which have bearings on each side of said axle, as shown in Fig. 1 of the drawings, for a purpose hereinafter explained.

The letters B B' denote chain-reaches attached to and extending diagonally across from the inner bearings of the coupling-plates $b$ of the front axle to the inner bearings of the coupling-plates $b'$ of the rear axle.

C C' represent bolsters which swivel on the axles.

The letter $C^2$ designates the adjustable coupling-pole, made in sections, as shown, each one of said sections being connected to the bolsters.

E E' are braces, which are secured at their outer ends to the bolsters and axles by means of bolts $c$ $c'$ and nuts $c^2$ $c^2$. The inner ends of these braces are secured to the coupling-pole $C^2$ by bolts and nuts, as shown.

D D' represent plates made in circular or ring shape. As here represented, these plates are connected to the ends of the coupling-pole by recesses therein, as shown in Fig. 2 of the drawings. The plates have their bearings on the upper surfaces of the axles and facilitate the turning of the wheels when both the axles change their position and assume a position like that shown in dotted lines, Fig. 1. This construction and arrangement of the plates, in connection with the reaches B B', when in operation to turn the axles, also prevent tipping or canting of the wheels. The bolsters C C' are provided with suitable standards, G G', whereby the body of the running-gear may be securely held on said bolsters. To the under side of the coupling C is secured a hanger, I, in which the crossed body portions of the chains are connected. By this arrangement the chains are prevented from sagging and more readily keeps the chains in proper position to perform the turning of the axles.

I wish it to be understood that the coupling-pole C and chain-reaches B B' can be dispensed with, and rods provided with hook ends can be substituted therefor and connected to the bearings of the couplings $b$ $b'$.

H represents a tongue or pole, having at its inner end a cross-bar, H', and, as illustrated in Fig. 1 of the drawings, this tongue or pole is made T shape. The pole is further provided with a rod, $h$, which passes through the lower inner end of the pole and through the cross-bar H', with its ends $h'$ detachably connected to the outer bearings of the couplings $b$. This pole can be transferred to the outer bearings of the couplings $b'$ of the rear axle.

When it is desired to bring the axles closer to one another, the coupling-pole can be adjusted by changing the bolts thereof from one perforation to another, and the reaches can be adjusted in their bearings accordingly.

Having described my invention, what I claim, and desire to secure by Letters Patent of the United States, is—

1. The combination, with the axles, bolsters, coupling-pole, and the braces E E', said axles, bolsters, coupling-pole, and braces connected together by bolts and nuts, of the circular plates or rings D D', connected to the coupling-pole, as shown and described.

2. The combination, with the axles having couplings $b\ b'$, provided with inner and outer bearings, the bolsters $C\ C'$, adjustable coupling-pole $C^2$, having hanger I, the reaches $B\ B'$, crossed at their centers and connected to the hanger, with their ends attached to the inner bearings of the couplings $c\ c'$, the braces $E\ E'$, connecting the axles, bolsters, and coupling-pole together by bolts and nuts, of the circular plates or rings $D\ D'$, connected to the coupling-pole, as shown and described.

3. The combination, with the T-shaped pole H, having cross-bar H', of the rod $h$, passing through the body of the pole, and also through the ends of the cross-bar, and having connecting ends $h'$, as shown and described, and for the purpose set forth.

In testimony whereof I affix my signature in presence of two witnesses.

MICHAEL C. HALL.

Witnesses:
FRANK REID,
JOHN W. RYERSON.